(12) United States Patent
Giroir et al.

(10) Patent No.: US 6,829,642 B1
(45) Date of Patent: Dec. 7, 2004

(54) METHOD AND SYSTEM FOR AUTOMATICALLY AND OPTIMALLY SELECTING A TN3270 SERVER IN AN INTERNET PROTOCOL NETWORK

(75) Inventors: Didier Giroir, Cagnes-sur-Mer (FR); Olivier Hericourt, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 09/604,022

(22) Filed: Jun. 27, 2000

(30) Foreign Application Priority Data

Jul. 1, 1999 (EP) ............................................. 99480056

(51) Int. Cl.[7] ............................................. G06F 15/173
(52) U.S. Cl. ...................................... 709/225; 709/224
(58) Field of Search ............................... 709/223, 224, 709/225, 228, 203, 105

(56) References Cited

U.S. PATENT DOCUMENTS

| | | | | |
|---|---|---|---|---|
| 5,640,541 A | * | 6/1997 | Bartram et al. | 703/26 |
| 5,742,762 A | * | 4/1998 | Scholl et al. | 709/200 |
| 5,774,660 A | * | 6/1998 | Brendel et al. | 709/201 |
| 5,774,668 A | * | 6/1998 | Choquier et al. | 709/223 |
| 5,862,328 A | * | 1/1999 | Colyer | 709/203 |
| 5,915,095 A | * | 6/1999 | Miskowiec | 709/223 |
| 5,958,013 A | * | 9/1999 | King et al. | 709/227 |
| 6,026,430 A | * | 2/2000 | Butman et al. | 709/203 |
| 6,041,041 A | * | 3/2000 | Ramanathan et al. | 370/241 |
| 6,092,178 A | * | 7/2000 | Jindal et al. | 712/27 |
| 6,122,276 A | * | 9/2000 | Boe et al. | 370/389 |
| 6,128,662 A | * | 10/2000 | Bolton et al. | 709/228 |
| 6,141,759 A | * | 10/2000 | Braddy | 713/201 |
| 6,192,411 B1 | * | 2/2001 | Chan et al. | 709/232 |
| 6,216,173 B1 | * | 4/2001 | Jones et al. | 345/705 |
| 6,408,335 B1 | * | 6/2002 | Schwaller et al. | 709/224 |
| 6,578,066 B1 | * | 6/2003 | Logan et al. | 709/105 |

FOREIGN PATENT DOCUMENTS

| | | | | |
|---|---|---|---|---|
| EP | 1041795 A1 | * | 10/2000 | H04L/29/06 |
| EP | 1045563 A1 | * | 10/2000 | H04L/29/06 |

OTHER PUBLICATIONS

Jabbari, B. et al., "Performance modeling and simulation of inquiry–response computer applications using VSATS", IEEE SUPERCOMM/ICC '90, vol. 2, pp. 376–380, Apr. 1990.*

Brock, J.D., "Tingle—a suite for monitoring networks", IEEE TRICOMM '91, pp. 235–242, Apr. 1991.*

Lynch, Daniel C. et al., "SNA and TCP/IP Enterprise Networking", excerpts from every chapter in book, www.manning.com/lynch/, 144 pages, 1997.*

Vokolos, F. I. et al., "Performance testing of software systems", ACM Workshop on Software and Performance, pp. 80–87, 1998.*

* cited by examiner

*Primary Examiner*—Jason D. Cardone
(74) *Attorney, Agent, or Firm*—Winstead Sechrest & Minick P.C.; John Pivnichny

(57) ABSTRACT

Disclosed is a method and system of selecting a server from a plurality of servers for accessing Systems Network Architecture (SNA) applications from a client in an Internet Protocol (IP) network. The method comprises the steps of measuring using measurement probes from one or a plurality of measurement systems distributed in the IP network, performance and availability of each server for accessing one or a plurality of SNA applications; transferring in a single system within the IP network said performance and response time measurements; selecting in said single system an appropriate server for accessing a particular SNA application using said performance and availability measurements.

72 Claims, 13 Drawing Sheets

Internal Storage of TN3270 Availability and Response Time Probes

Flow Chart of an Availability and Response Time Probe

Internal Storage of TN3270 Availability and Response Time Probes

METHOD AND SYSTEM FOR AUTOMATICALLY AND OPTIMALLY SELECTING A TN3270 SERVER IN AN INTERNET PROTOCOL NETWORK

TECHNICAL FIELD OF THE INVENTION

The present invention relates to computer networks, and more particularly to a method and system in an Internet Protocol (IP) network for automatically and optimally selecting a Telecommunications Network ("Telnet") 3270 Server according to response time and availability criteria.

BACKGROUND

SNA and IP Environment

Every day, for all sorts of reasons, more and more companies are focusing on the consolidation of the multiple specialized networks they directly operate or lease from service providers onto a single protocol network. These multiple specialized networks are based on diverse networking technologies such as Systems Network Architecture (SNA), Internet Protocol (IP) or Internetwork Packet Exchange (IPX).

These companies are making this consolidation one of their top priorities. Companies are almost exclusively selecting the Internet Protocol (IP) as their protocol of choice. However, for the overwhelming majority of these companies using SNA protocols and applications, there still is and will be for the many years to come, a major requirement in this changing environment. The requirement is for the employees of these companies to keep the capability they always had to access the huge amount of existing corporate data residing in traditional mainframes and accessible through SNA applications.

TCP/IP

The Internet is a global network of computers and computers networks. The Internet connects computers that use a variety of different operating systems and languages, including UNIX, DOS, Windows, Macintosh, and others. To permit communication among these various systems and languages, the Internet uses a standard language referred to as TCP/IP ("Transmission Control Protocol/Internet Protocol"). The TCP/IP protocol supports three basic applications on the Internet: transmitting and receiving electronic mail, logging into remote computers ("Telecommunications Network" or "Telnet"), and transferring files and programs from one computer to another ("FTP" or "File Transfer Protocol").

World Wide Web

With the increasing size and complexity of the Internet, tools, often called navigators or navigation systems, have been developed to help find information on the network. Navigation systems that have been developed include programs such as Archie, Gopher and WAIS. The World Wide Web ("WWW" or "the Web") is a recent superior navigation system. The Web is:

an Internet-based navigation system, an information distribution and management system, and a dynamic format for communication.

The Web seamlessly integrates several forms of information, including still images, text, audio and video. A user on the Web using a Graphical User Interface ("GUI", pronounced "gooey") may transparently communicate with different host computers on the Internet different system applications (including FTP and Telnet), and different information formats for files and documents including, for example, text, sound and graphics.

Hypermedia

The Web uses hypertext and hypermedia. Hypertext is a subset of hypermedia and refers to computer-based "links" through which uses move from one place to another in a document, or to another document, in a non-linear manner. To accomplish this feature, the Web uses a client-server architecture. The user's computer is said to be a client computer to the Web server computer. Web servers enable a user to access hypertext and hypermedia. The clients send requests to the Web servers, which in turn react, search and respond. The Web allows client-based application softwares to request and receive hypermedia documents (including formatted text, audio, video and graphics) from a Web file server with hypertext link capabilities to other hypermedia documents.

The Web, then, can be viewed as a collection of document files residing on Web host computers that are interconnected by hyperlinks using networking protocols, forming a virtual "web" that spans the Internet.

Uniform Resource Locators

A resource on the Internet may be unambiguously identified by a Uniform Resource Locator (URL), which is a pointer to a particular resource at a particular location. A URL specifies the protocol used to access a server (e.g. http://, ftp://, etc.), the name of the server (e.g. www.ibm.com, and the location of a file on that server (e.g. /products/catalog.html).

HyperText Transfer Protocol (HTTP)

Each Web page may appear as a complex document that integrates many media, for example, text, images, sounds and animation. Each such page may also contain hyperlinks to other Web documents, so that a user at a client computer may click on icons using a mouse and may activate hyperlink jumps to a new page (which is a graphical representation of another document file) on the same or a different Web server.

A Web Server is a software program run on a Web host computer that responds to requests from Web Clients, typically over the Internet. All Web servers use a language or protocol to communicate with Web Clients which is called HyperText Transfer Protocol ("HTTP") graphics, sound and video. All types of data, including HyperText Markup Language ("HTML"), can be exchanged among Web servers and clients using this protocol. HTML describes the layout, contents and hyperlinks of the documents and pages to be displayed to the user. When browsing, Web Clients convert user-specified commands into HTTP GET requests, connect to the appropriate Web Server to obtain the information, and await a response. The response from the server may be the requested document or an error message. After a document or an error message is returned, the connection between the Web client and the Web server is closed.

The first version of HTTP is a stateless protocol. That is to say, with HTTP version 1.0, there are no continuous connections between clients and servers. A Web client using HTTP receives a response as HTML data or other data. Newer versions of HTTP break this barrier of a stateless protocol by keeping the connection between the server and client alive under certain conditions.

Browser

After receipt, the Web Client formats and presents the data or activates an ancillary application, such as a sound player, to present the data. To do this, the server or the client first determines the type of data to be received. The Web Client is also referred to as the "Web Browser," since it in fact browses documents retrieved from the Web Servers.

Telnet 3270

A widely used technique for the transport of SNA information across an IP network is the use of Telnet technologies, specifically the Telnet 3270 ("TN3270") emulation. This technique for SNA "green screen" workstation users utilizes a Client/Server approach. "Host-On Demand" from IBM or "WebClient" from CISCO are examples of Client software implementations. Network Utility from IBM or CISCO router's offerings are typical server implementations (hardware and software). The "TN3270 Client" software usually runs within the customer's workstation while the "TN3270 Server" software is usually placed in front of the customer's data center mainframes (or sometimes directly within the mainframe itself) or within the customer's branch offices.

As illustrated in FIG. 1, IP protocols are used between the TN3270 Server 102 and the TN3270 Clients 101, while traditional SNA protocols are used between the TN3270 Server 102 and the target SNA applications 103. More information concerning Telnet, TN3270 and Network Utility can be found in the following publications, incorporated herewith by reference:

"TCP/IP Tutorial and Technical Overview," Martin W. Murhammer, Orcun Atakan, Stefan Bretz, Larry R. Pugh, Kazunari Suzuki, David H. Wood, IBM International Technical Support Organization, October 1998, GG24-3376-05.

"IBM 2216/Network Utility Host Channel Connection," Erol Lengerli, Jacinta Carbonell, Thomas Grueter; IBM International Technical Support Organization, January 1999, SG24-5303-00.

"IBM Network Utility Description and Configuration Scenarios," Tim Kearby, Peter Gayek, Gallus Schlegel, Imre Szabo, Zhi-Yong Zhang; IBM International Technical Support Organization, January 1999, SG24-5289-00.

"Internetworking with TCP/IP—Volume I—Principles, Protocols, and Architecture," Douglas E. Comer, Second Edition, Prentice Hall 1991.

Requests For Comments (RFCs) from the Internet Engineering Task Force (IETF):

RFC 1576: TN3270 Current Practices,

RFC 1646: TN3270 Extensions for LU name and Printer Selection,

RFC 1647: TN3270 Enhancements, and

RFC 2355: TN3270 Enhancements.

Accessing SNA Application via Traditional SNA End-to-End

In the traditional SNA world, user workstations traditionally obtain access to SNA applications by connecting first to an intermediate application. This intermediate application provides for access to the real target application. This intermediate application, also referred to as an Intermediate Selection Application, usually displays to the user a selection screen which lists the SNA applications that may be accessed. The user selects from that menu the target SNA application he wants to access and is then connected to that target SNA application, which usually presents to the user an application welcome screen (for instance displaying the SNA application name and asking for a user logon and password). FIG. 2 describes a traditional SNA access to an Intermediate Selection Application in an SNA environment.

First step 201: The user is presented a Selection Screen of a plurality of possible applications by the Intermediate Selection Application (three possible applications A, B and C). Usually, the workstation automatically sets up a direct connection to the Intermediate Selection Application, as soon as the workstation's SNA protocol stack is started (or, in case of a "dumb" terminal, when the terminal is powered on). Second step 202: Provided that at this time the Intermediate Selection Application is up and running, the connected user selects an application (application A) by typing an application name on the selection screen. Third step 203: Finally, the user is connected to the desired application (application A), which usually presents to the user an application welcome screen.

Accessing SNA Application from TN3270 Client with Manual Configuration

TN3270 Clients can be manually configured with the IP address or name of the TN3270 Server which needs to be accessed to reach the target SNA application. The main drawback to this setup is that the TN3270 Server selection is then static. There is no dynamic criteria for selecting the TN3270 Server, such as the response time. TN3270 Server failures require manual reconfiguration of the TN3270 Clients to point to an alternate active TN3270 Server, since manual configuration usually allows the definition of only a single TN3270 Server and no ability to define a backup TN3270 Server configuration.

Accessing SNA Application from TN3270 Client with Dynamic Configuration

In a TN3270 Client-Server approach, one technique commonly applied is to provide the Intermediate Selection Application via a Web Server implementation. In such a case, the user accesses the Intermediate Selection Application within the Web Server, using his favorite Web Browser running on his user workstation. This approach is described in FIG. 3:

First step 301: The user receives a Selection Screen on the Web Browser from the Intermediate Selection Application in the Web Server. The selection screen may offer three applications: A, B and C. By selecting the desired SNA Application from the Selection Screen (just a click from within the Browser), the workstation obtains the IP addressing/naming information corresponding to the preferred TN3270 Server for the desired target SNA application.

Second step 302: If the user chooses application C from the Selection Screen, the user workstation obtains from the Web Server the address (SS) for the TN3270 Server(s) (providing access to the mainframe housing application C).

Third step 303: Thus, the local TN3270 Client can then be started either manually or automatically to access the preferred Telnet server by using the address provided by the Intermediate Selection Application. The user workstation receives back the address of the Telnet server (Server S which address is SS) and connects to the target application C via the appropriate Server (Telnet Server S). The target application C then presents an Application Welcome Screen to the user (for instance displaying the SNA application name and asking for a user logon and password).

Going through an Intermediate Selection Application shields end-users from changes that inevitably occur, for example, when an SNA application is changed from being run on one server to another server in a different location or when a new SNA application is added. In such cases, only the Selection Screen is modified and changes in target application locations are completely transparent to the users. The workstations' configurations are not impacted by changes in target application locations.

Problem

The problem is to provide a system and method for automatically configuring the TN3270 Client to use the best TN3270 Server to access the desired SNA Application. Current solutions address the problem of configuring the TN3270 client only partially. TN3270 Clients can be manually configured with the target TN3270 Server. The main drawbacks of this solution are as follows:

(a) There is no dynamic TN3270 Server selection;

(b) When the TN3270 Server is in failure, a manual reconfiguration of the TN3270 Client is required; and (c) TN3270 Server names or addresses must be known and manually configured by end users for each SNA Application the user wants to access.

(d) Only a "manual" load balancing through the static configuration of the TN3270 Clients is provided.

TN3270 Clients can also be dynamically configured for a target TN3270 Server corresponding to the desired SNA Application using an Intermediate Selection Application running on a dedicated Web Server. The main drawbacks concerning this solution are as follows:

(a) There is no response time consideration in the TN3270 Server selection;

(b) There is no efficient TN3270 Server failure detection (i.e. to access a particular SNA application, the Web Server will always select the same TN3270 Server to the end users, even if that Server has failed);

(c) The connection to the SNA Application is indirect, since the end user has to first manually connect to a Web Server to receive the Selection Screen. This Web Server connection terminates each time the end user wants to access an SNA Application, even if the Intermediate Selection Application is able to determine the best TN3270 Servers and is able to detect TN3270 Server failures.

Current solutions also only partially address the problem of selecting the best TN3270 server. When the TN3270 server is selected according to some response time standards, the response time is usually measured from as to a single system and does not integrate all the network delays between end users and SNA Applications. As a consequence, the measured response time by the single system is not representative of the response time perceived by the entire group of end users. End users are geographically dispersed and a single system cannot take into account the geographical specificities of each end user. For instance measuring the response time of a TN3270 Server located in Paris may not be representative of the response time perceived from Toulouse because the measurement does not integrate the network delay between Toulouse and Paris.

The response time can also be measured from each TN3270 Client, but this solution induces a very heavy load on each user workstation.

When the TN3270 Server is selected according to some anti-failure specifications, failures are usually detected from one system. However, multiple end users are usually accessing the same TN3270 Servers, and those end users are geographically dispersed. A single system will not be able to detect all network failures and cannot take into account the geographical specificities of each end user.

Other solutions provide clustering of TN3270 Servers using an external dispatcher system acting as single logical access point. All TN3270 Clients are manually configured with the address of the external dispatcher system (as the target TN3270 Server). Traffic is then routed to a selected TN3270 Server. An example of such dispatcher is the IBM Interactive network Dispatcher. More information concerning this product can be found in IBM's publication entitled "Interactive Network Dispatcher V1.2—User's Guide" GC31-8496-01 incorporated herein by reference. Although a dispatcher-oriented solution allows an efficient load balancing in most cases, the main drawbacks are as follows: An additional dedicated system or a specific hardware is required, introducing an additional software layer between end users and SNA Applications (with potential negative effects on performance). Also, the external dispatcher name must be manually configured by end users in their TN3270 Clients.

The present invention optimizes the TN3270 Server selection by using availability and response time criteria. The present invention also optimizes the TN3270 service performance by integrating a response time consideration to the TN3270 Server selection. The present invention insures a better service availability by automatically detecting TN3270 Servers failures. The present invention also integrates the network delay between TN3270 clients and SNA applications when measuring availability and response time of TN3270 servers.

SUMMARY OF THE INVENTION

The present invention relates to automatic TN3270 Client configuration and more particularly to a method and system for optimizing the selection of a TN3270 Server according to response time and availability criteria. The method comprises the steps of measuring, using measurement probes from one or a plurality of measurement systems distributed in the IP network, performance and availability of each TN3270 server for accessing one or a plurality of SNA applications; transferring the performance and response time measurements to a single system within the IP network; and selecting within the single system an appropriate TN3270 server for accessing a particular SNA application using the performance and availability measurements.

The present invention also comprises distributed availability and response time probes for retrieving a SNA Application Welcome Screen through each TN3270 Server providing access to the same SNA Application, measuring the associated response time, and detecting TN3270 failures or degradation of response time. The present invention also relates to a Master Probe program for retrieving and aggregating measurement data provided by the distributed availability and response time probes. The present invention uses a CGI (Common Gateway Interface) program for dynamically creating an Autoserver code (in an alternative embodiment, in Javascript language) on an Autoserver URL (Universal Resource Locator) system. The Autoserver code may be used to select the best TN3270 Servers to access the desired SNA Applications according to availability and response time information provided by the Master Probe.

The present invention fixes the drawbacks of the prior solutions by measuring the availability and response time from probes distributed close to end users or groups of end users. Since probes are geographically close to end users, data provided by the probes is representative of the TN3270 service (in terms of availability and response time) observed by the end users. The present invention provides the following advantages:

(a) Early detection of TN3270 Servers failures, providing a high TN3270 service availability;

(b) Integration of a response time factor to the TN3270 Server selection optimizes TN3270 service performances;

(c) TN3270 Servers response time is measured from multiple distributed systems closer to end users;

(d) Because they integrate network delays, these distributed systems provide accurate information concerning the response time perceived by end users;

(e) TN3270 Servers failures are detected from multiple distributed systems closer to end users;

(f) The distributed systems provide an accurate information concerning the failures perceived by the users;

(g) Induced IP and SNA survey traffic is minimized by running the distributed availability and response time probes from a limited number of systems (compared with running the probes from each TN3270 Client system);

(h) Integration of response time degradation in the distributed probes achieves proactive TN3270 Server failure detection;

(i) Periodic updates of "best" or preferred TN3270 Servers can be provided (automatically or on request) to TN3270 Clients.

(j) Useless traffic to failing TN3270 Servers is minimized since failed TN3270 Servers are excluded from the list of available target servers immediately upon proactive detection;

(k) TN3270 Client performances are not degraded because availability and response time data are not processed within the downloaded Autoserver code but rather in the Autoserver URL system;

(l) The TN3270 Client is only connected once (when it is started) to the Autoserver URL system to receive the Autoserver code providing the selection of the best TN3270 Servers;

(m) The TN3270 Client can use a local copy of the Autoserver code if the Autoserver URL system cannot be reached, providing stability; and (n) The end user need not first connect to an Intermediate Selection Application in order to access a desired SNA Application, since his TN3270 Client is automatically connected to the best TN3270 Server.

Several other advantages will be apparent to one skilled in the art, in light of this disclosure.

BRIEF DESCRIPTION OF THE DRAWINGS

The novel and inventive features believed characteristics of the invention are set forth in the appended claims. The invention itself, however, will best be understood by reference to the following detailed description of an illustrative detailed embodiment when read in conjunction with the accompanying drawings, wherein

DETAILED DESCRIPTION OF THE INVENTION

SNA and IP Environments
Extension of Networks

To remain competitive, network users are extending their traditional internal SNA and IP networks outward to business partners, dealers, suppliers, and customers. In this expanding environment, users are also searching for ways to save money and provide connectivity between their mix of SNA and TCP/IP server applications and their TCP/IP and SNA desktop client population.

Consolidation of Networks

Many companies today are considering the consolidation of their WAN traffic onto a single IP-only backbone. At the same time, other companies are simplifying their workstation configurations and attempting to run only the TCP/IP protocol stack at the desktop. However, most of these companies still require access to SNA applications hosts.

Telnet 3270

Telnet 3270 meets these requirements by allowing the end user to run IP from the desktop over the network and attach to his SNA host through a TN3270 server. The clients connect to the server using a TCP connection. The server provides a gateway function for the downstream TN3270 clients by mapping the client sessions to SNA-dependent Logical Unit to Logical Unit ("LU-LU") sessions that the server maintains with the SNA host. The TN3270 server handles the conversion between the TN3270 data stream and an SNA 3270 data stream. As mentioned above, the path from a TN3270 client to the SNA host consists of:

1. A TCP connection over IP from the client to the server; and

2. An SNA LU-LU session from the server to the host.

Connecting to a host for establishing a LU-LU session can be accomplished using a traditional sub-area connection or using an APPN connection.

To deploy a TN3270 solution, TN3270 client software is installed on desktop workstations and TN3270 server software is installed in one of several places discussed below. Client software is available from IBM and many other vendors which runs on top of the TCP/IP stack in the workstation. A given client product may provide one of two possible levels of standard support:

1) Base TN3270 client; or These clients conform to RFC 1576 (TN3270 Current Practices) and/or RFC 1646 (TN3270 Extensions for LU name and Printer Selection).

2) TN3270E client. These clients conform to RFC 1647 (TN3270 Enhancements), and 20RFC 2355 (TN3270 Enhancements).

A server implementation that can support TN3270E clients is called TN3270E server. The TN3270 server function can be placed in a variety of products and positions within a network, including in the SNA host itself; in a router in front of the data host or within the network or in a specialized box within the network.

Access of SNA Applications via Telnet 3270 Servers

Figure 4:
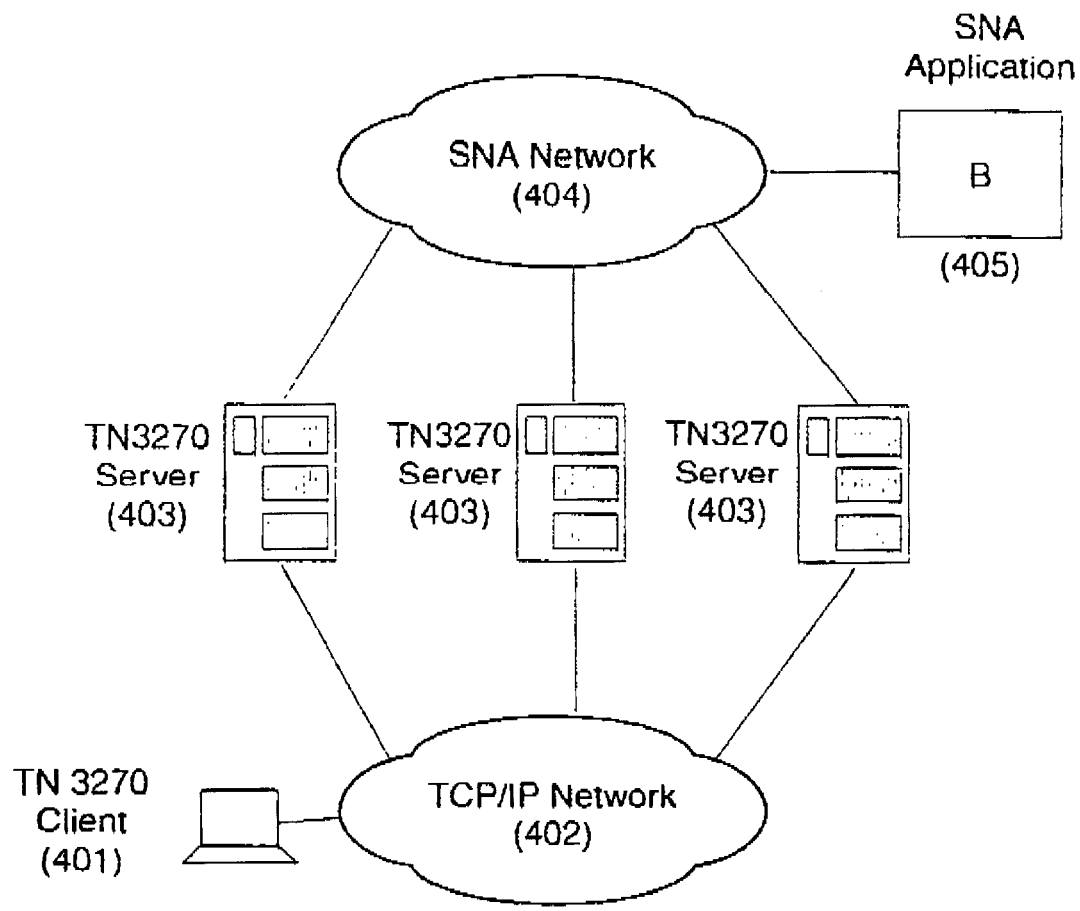
FIG. 4 is a view of the TN3270 environment, according to prior art.

FIG. 4 shows an end user workstation 401 accessing SNA Applications 405 via TN3270 Servers 403. The end user workstation 401 hosts a web Browser and a TN3270 Client and is connected to the IP network 402. The TN3270 Servers 403 attach both the IP network 402 and the SNA Network 404. They act as intermediaries or interfaces for the communications between these two networks. The systems hosting the destination SNA Applications 405 also connects to the SNA Network. Multiple TN3270 Servers can be used to access the same SNA Application in order to provide some degree of access robustness and load balancing.

Figure 5:
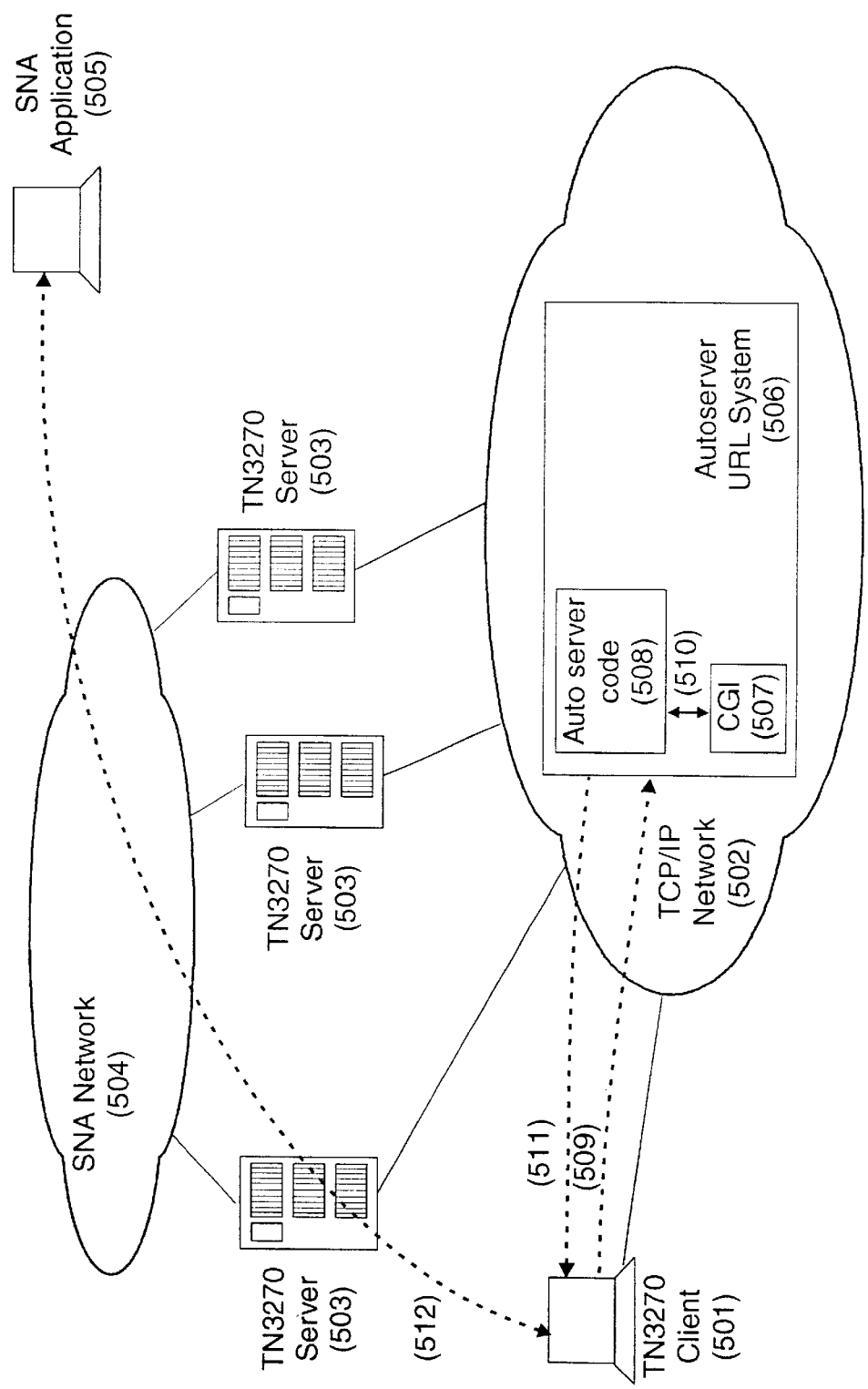
FIG. 5 is a view of the data flow generated by the automatic configuration of the TN3270 Client according to the present invention.

Automatic Configuration of TN3270 Clients
Autoserver URL System and Autoserver Code The environment where the invention is used is described in FIG. 5, where an end user within a IP Network wants to access SNA Applications using a TN3270 Client, and where the SNA Applications can be reached through one or several TN3270 servers. The problem is to automatically configure the TN3270 Client to access the SNA Application the user wants to reach through the appropriate TN3270.

The TN3270 Client 501 is attached to the TCP/IP Network 502, while the SNA Application 505 is attached to the SNA Network 504. The TN3270 Client 501 is configured with an Automatic Server Configuration option, and the URL (Universal Resource Locator) of a system called Autoserver URL system 506 is provided as a configuration parameter.

When it is started, the TN3270 Client 501 automatically connects 509 to the Autoserver URL system 506. The Autoserver URL system uses a CGI (Common Gateway Interface) 507 program to dynamically generate 510 an Autoserver code 508 (which may be Javascript code in an alternate embodiment). This Autoserver code contains the list of all the SNA Applications that can be accessed by the end user with the designated TN3270 Servers. The Autoserver code is downloaded to the TN3270 Client 511 when the TN3270 Client connects to the Autoserver URL system. The user can then access 512 the target SNA Application.

The TN3270 Client connection to the Autoserver URL system, and the download of the Autoserver code to the TN3270 Client can for instance be done using HTTP protocol. In this case, the Autoserver URL system can be a Web Server. If the TN3270 Client cannot reach the Autoserver URL system, the TN3270 Client can use a local copy of the Autoserver code which was saved at a previous connection.

Access to SNA Applications from a Configured TN3270 Client

Figure 6:
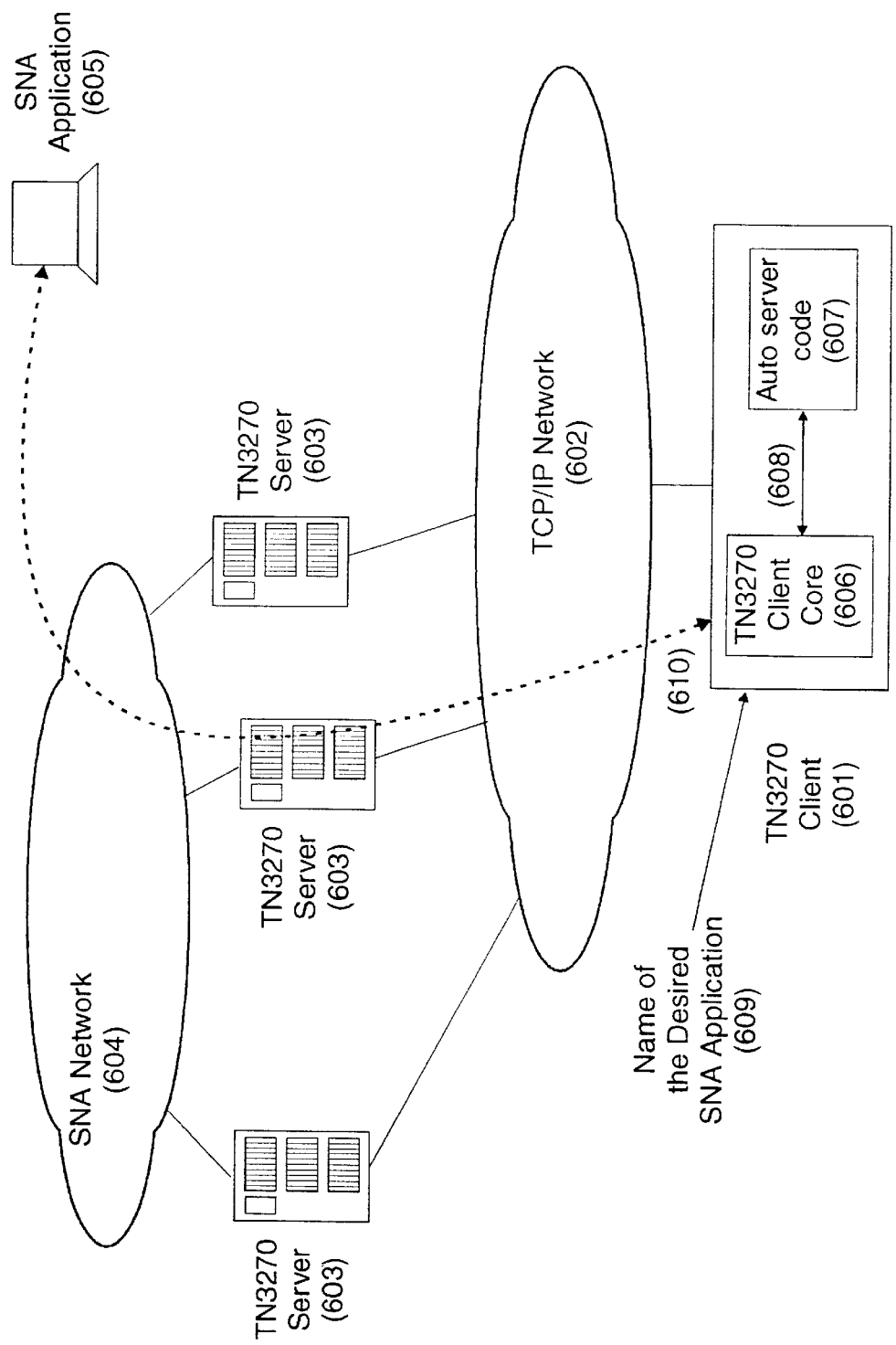
FIG. 6 describes the process of accessing a desired SNA Application from a TN3270 Client with an Automatic Server Configuration option according to the present invention.

FIG. 6, in conjunction with FIG. 5 describes the method and system for connecting an end user to a desired SNA Application. Again, the TN3270 Client 601 attached to the IP Network 602 is configured with the Automatic Server Configuration option, retrieving the Autoserver code from the Autoserver URL system. The Autoserver code determines the appropriate TN3270 Server 603 that must be used to access the desired SNA Application 605 within the SNA network 604. The Autoserver code (which may be written in Javascript, in one embodiment) is downloaded to the TN3270 Client as previously shown with reference to FIG. 5.

The TN3270 Client 601 program comprises a TN3270 Client Core component 606, which uses 608 the Autoserver code 607 in order to configure the TN3270 Client to use the appropriate TN3270 Server for accessing the desired SNA Application. When the end user wants to access one or multiple SNA Applications, the end user first starts the TN3270 Client 601. The end user then enters 609 the name of the SNA Application desired, using, for instance, a "Desired SNA Application" input window in the TN3270 Client screen. Inside the TN3270 Client, the TN3270 Client Core component 606 then reads 608 the Autoserver code 607 in order to find the TN3270 Server which is designated to provide access to the desired SNA Application. The TN3270 Client Core component then automatically configures the TN3270 Client to connect to that designated TN3270 Server. The connection to the SNA Application via that TN3270 Server is then established 610. The end user is now in session with the desired SNA Application.

In an alternate embodiment, the TN3270 Client may present to the user a list of SNA Applications that are contained in the Autoserver code. In this way, the end user need not explicitly enter the SNA Application name, but instead may select one application from a list displayed by his TN3270 Client.

Availability and Response Time Probes
Physical View

The context of the invention is described in FIG. 4, where an end user within an IP network desires access through a plurality of TN3270 Servers to one or a plurality of SNA Applications. The goal is to automatically select the "best" or optimal TN3270 Server to ensure an optimized availability and response time of the service offered to the end user.

Figure 7:
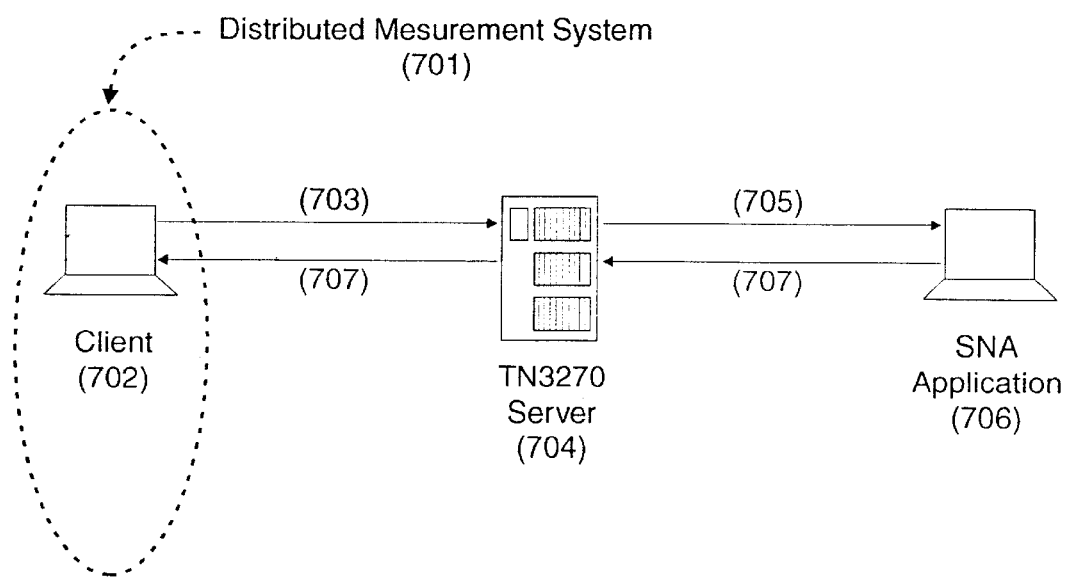
FIG. 7 is a view of the data flow associated with distributed availability and response time probes according to the present invention.

To automatically optimize the TN3270 Server selection, a software component called "TN3270 Availability and Response Time Probe" is introduced. Its role is to provide some selection criteria. As shown in FIG. 7, the time required to respond to a request for connection to an SNA Application is measured and stored.

Figure 1:
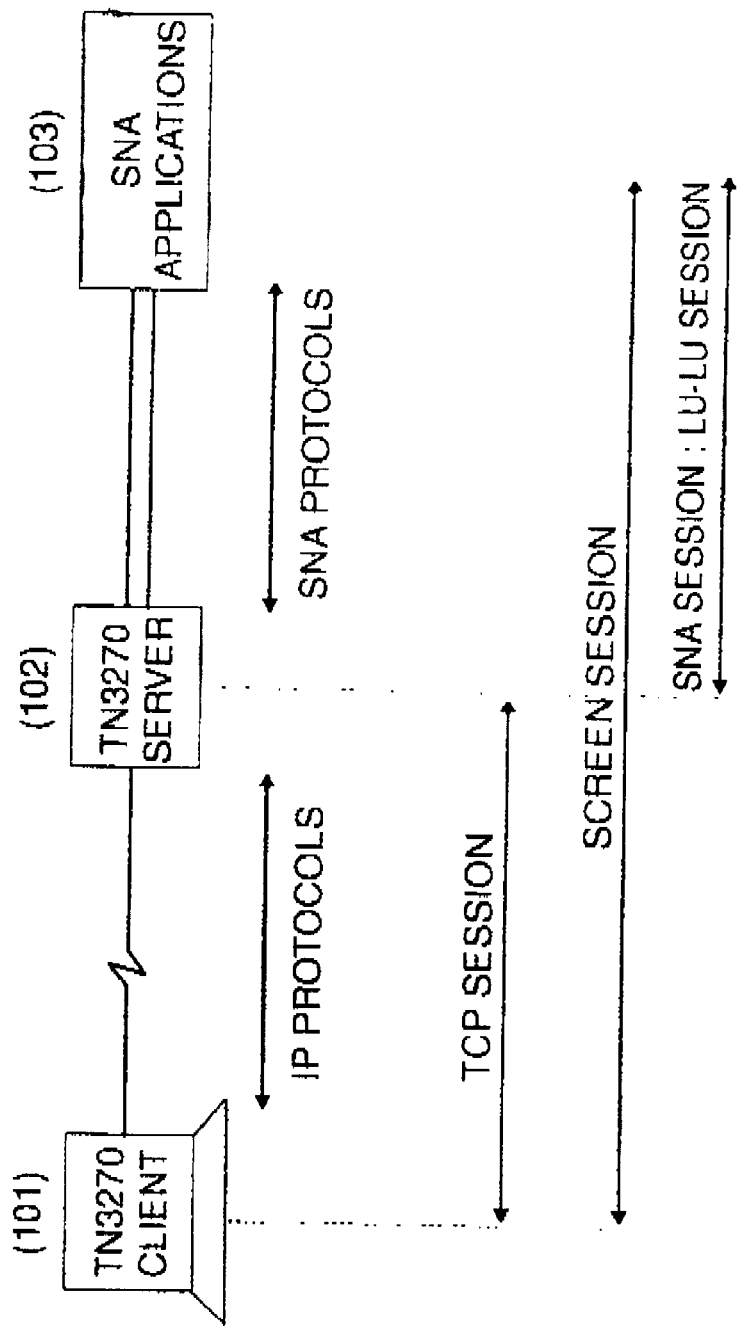
FIG. 1 is a general view of a Client accessing SNA Applications in a TN3270 environment, according to prior art.
Figure 2:
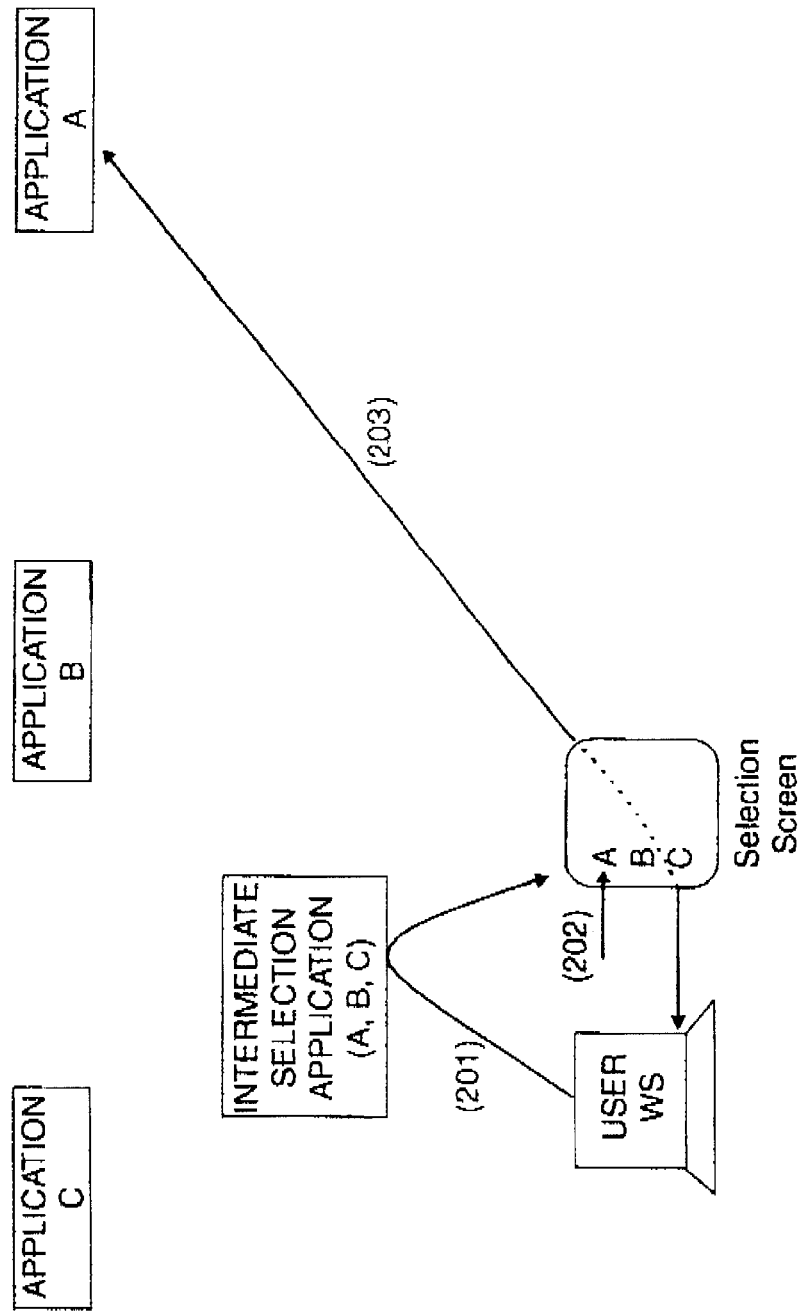
FIG. 2 is a view of a system for accessing SNA Applications via an Intermediate Selection Application in a traditional SNA environment, according to prior art.
Figure 3:
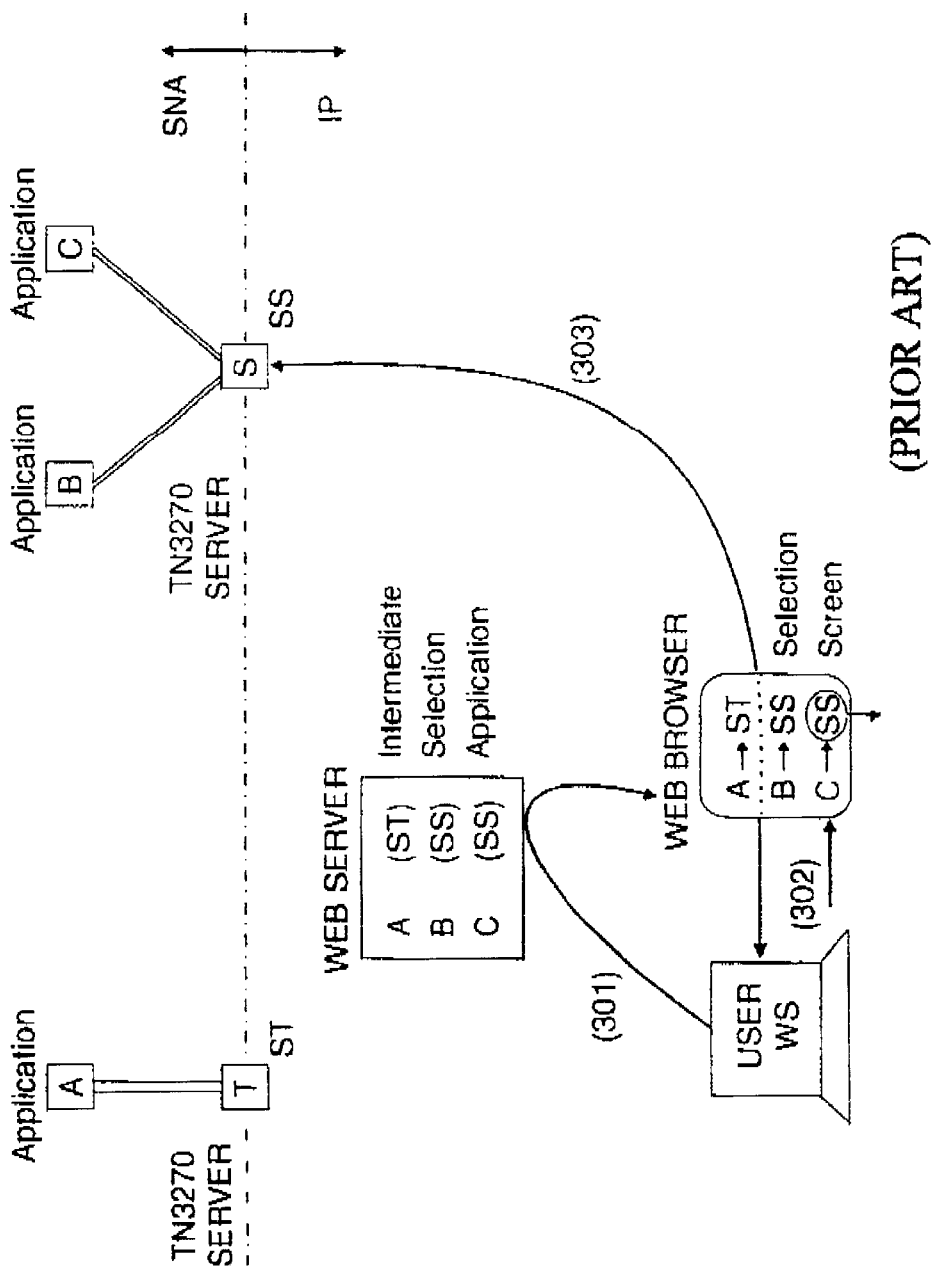
FIG. 3 is a view of a system for accessing SNA Applications via an Intermediate Selection Application in a TN3270 environment, according to prior art.

FIG. 7 demonstrates the function of a flexible TN3270 Availability and Response Time Probe and shows how it can be used to gather measurements on the availability and response time of TN3270 Servers. A Probe Client 702 configured to test TN3270 Servers requests 703 a connection to an SNA Application 706 via a TN3270 Server 704. This process is similar to the general connection process demonstrated in FIG. 1. The TN3270 Server 704 forwards 705 the request for connection to the SNA Application 706. Once the connection is established, the SNA Application 706 sends an Application Welcome Screen 707 to the Probe Client 702. The Probe Client 702 times how long the request/response survey flow takes to establish the connection and to receive the Application Welcome Screen. The Probe Client 702 uses this information as a measurement of the availability and response time of the tested TN3270 Server.

The same process can be used for each SNA Application the end user wishes to access, in order to determine the "best" TN3270 Server for each SNA Application. The results can then be encoded in the Autoserver code the TN3270 Clients use to select TN3270 Servers. Obviously if there is no response to the Probe Client connection request, then the particular TN3270 Server that is tested can be flagged as unavailable.

Internal Logic

Figure 8:
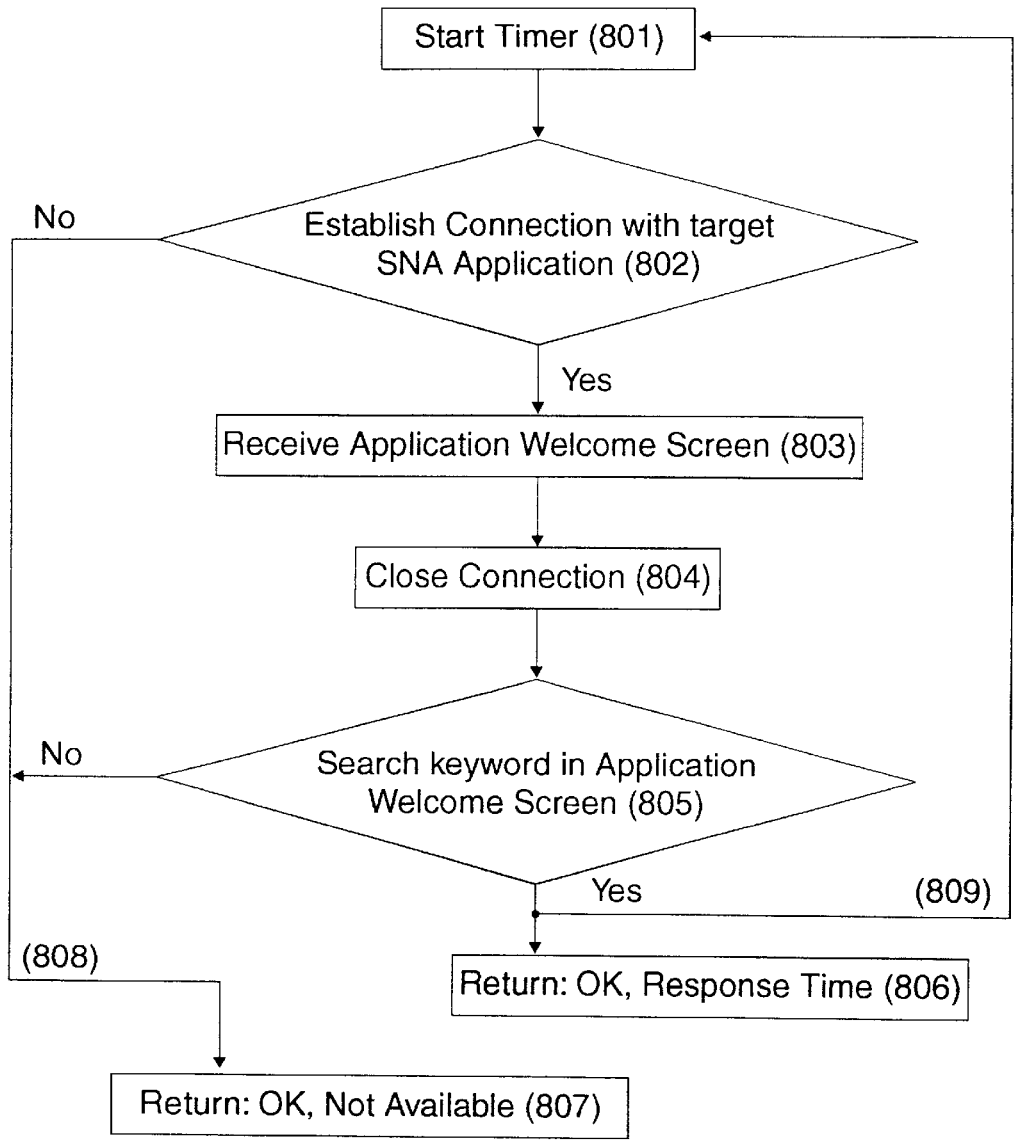
FIG. 8 is a flow chart showing the internal logic of a distributed availability and response time probe according the present invention.

The internal mechanism of the Probe itself is described in FIG. 8. The Probe simulates a TN3270 Client by requesting a connection to an SNA Application through a target TN3270 Server (using its host name and port as a reference). Once the connection is successfully established, an Application Welcome Screen is sent by the host processing the SNA Application to the TN3270 Client. The Probe checks that the Application Welcome Screen is received within an allowed amount of time and contains a specific keyword, or multiple specific keywords, to insure that the received Application Welcome Screen is correct. When these two conditions are fulfilled, the connection to the host processing the SNA Application is considered successful. Finally, the Probe returns either the associated response time in seconds (in the event of a successful connection) or a failure return code. Connections can be established to one or multiple target SNA Applications. When multiple SNA Applications are tested, each SNA Application may be sequentially tested until a connection is successful or all connections fail.

In summary, the Probe mechanism:
- (a) connects to SNA Applications through each TN3270 Server;
- (b) measures associated response time; and also
- (c) detects TN3270 Servers failures and the degradation of the response time.

FIG. 8 is a flow chart showing the internal logic of the TN3270 Availability and Response Time Probe introduced in FIG. 7. First, the Probe program starts 801 a timer. Next, the Probe program attempts to establish 802 a connection with the system hosting the target SNA Application. The Probe program establishes the connection via a TN3270 Server (e.g. the TN3270 name is provided to the Probe program as input parameter).

If the attempt for establishing the connection is unsuccessful 808, the Probe program immediately enters an error mode. An error value is returned 807 by the Probe program indicating that the connection with the system hosting the SNA Application is not possible.

If the attempt for establishing the connection is successful 803, then an Application Welcome Screen sent by the SNA Application is received by the Probe program. The probe program then closes 804 the connection pursuant to the normal TN3270 procedure.

To ensure that the Application Welcome Screen has been correctly retrieved, the probe program then searches 805 for a known keyword in the Application Welcome Screen. If the keyword is found in the Application Welcome Screen 806, then the session is considered successful. The timer is stopped and the response time for the operation is returned. By storing and integrating a short historic record of the measured response times over a period of time, the Probe program can detect and report any response time degradation, thus anticipating failures on TN3270 Servers.

If the correct keyword is not found in the Application Welcome Screen 807, then the connection to the SNA Application is considered unsuccessful and an error value is returned. The type of event that might trigger this kind of error is when the connection is successfully established with the system hosting the SNA Application, but an erroneous Application Welcome Screen is retrieved. In an alternative embodiment, the Probe may go into a retry mode 809 when the Probe is configured to try multiple destination SNA Applications, as opposed to a single SNA Application. This retry mode 809 adds some depth to the testing of the TN3820 Server system and insulates the testing somewhat from one-time network "glitches" (e.g., dropped connections, etc.).

Internal Storage

Figure 9:
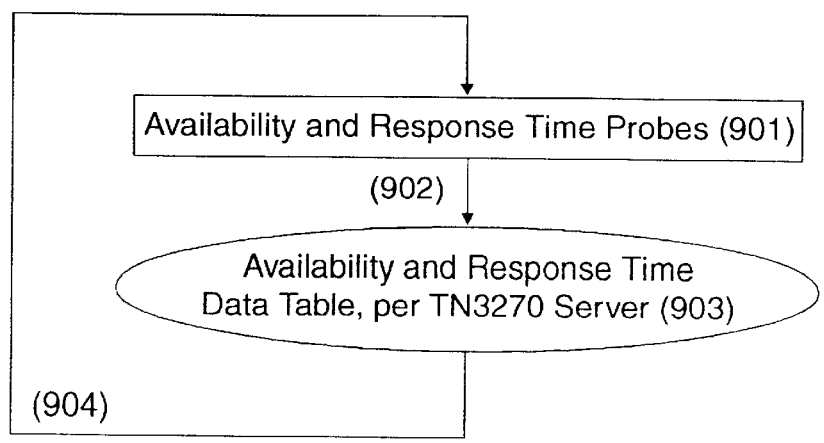
FIG. 9 depicts the storage of probes measurements according to the present invention.

FIG. 9 depicts the internal storage of the information retrieved by the Availability and Response Time Probes 901. Each Probe updates 902 a local table 903 within the Probe system with the measurements relating to each TN3270 Server it tests. In this way, the local table contains the current state of each TN3270 Server candidate to be selected and used by TN3270 Clients. At pre-selected or periodical time intervals, the TN3270 Servers 904 are tested again and the cycle is repeated. The local table where measurement data is stored is called the "Availability and Response Time Data Table".

Distributed Probes

Distributed Measurement Systems

Figure 10:
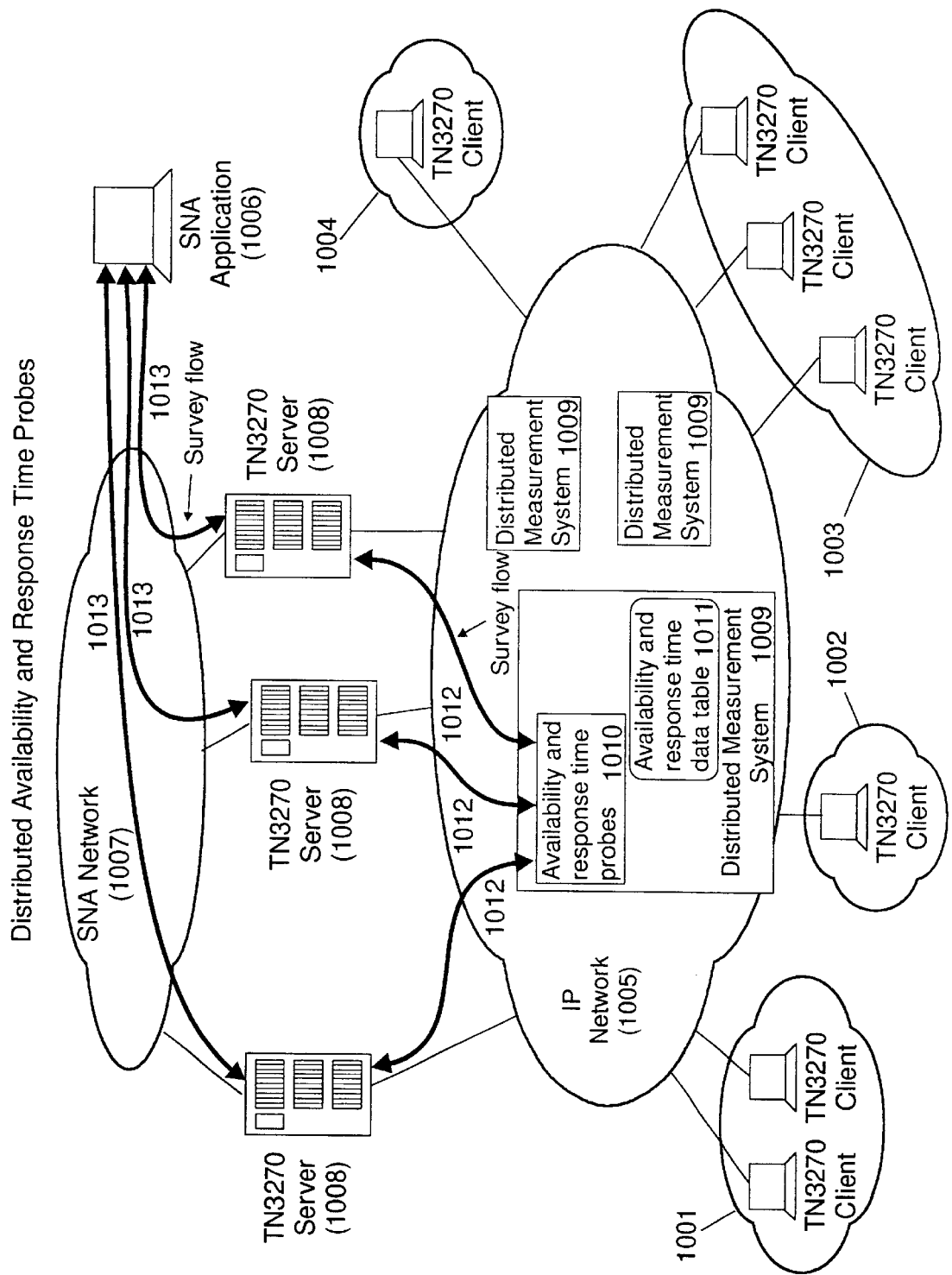
FIG. 10 is a general view of the data flow associated with the availability and response time probes in a distributed environment according to the present invention.

As shown in FIG. 10, in a distributed environment, Probes are processed by various components in order to provide measurements as close as possible to the reality perceived by the end users. TN3270 Clients 1001, 1002, 1003, 1004 are attached to the IP Network 1005, while SNA Applications 1006 are attached to the SNA Network 1007. Usually, TN3270 Clients are spread in multiple physical locations. For example, FIG. 10 depicts four groups of TN3270 Clients 1001, 1002, 1003, 1004). Typically, these groups of users are located in different places (for instance 1001 may be in Paris and 1002 could be in Toulouse). To provide measurements from multiple locations in the IP network, multiple systems called "Distributed Measurement Systems" 1009 may be used. Each Distributed Measurement System tests 1012, 1013 the access to SNA Applications 1006 through TN3270 Servers 1008 by means of Availability and Response Time Probes 1010. Within the Distributed Measurement System, each Probe updates a table 1011 containing the measurements of each TN3270 Server that is tested.

A Distributed Measurement System provides measurements for a group of users in a particular location. Distributed Measurement Systems must be physically located as close as possible to the group of end users as possible because the measured response time integrates the network delays. The closer a Distributed Measurement System is to a particular group of TN3270 Clients, the more accurate end-to-end (from end user to SNA Application) measurement data will be for that group.

The number and the location of these Distributed Measurement Systems in an IP Network depends on the required measurement accuracy and the number and dispersion of end users. It is not mandatory to have one dedicated Distributed Measurement System per group of users. A particular Distributed Measurement System may provide accurate measurement data for multiple groups of users, provided that the groups are close enough. Each Distributed Measurement system may therefore be responsible for providing measurement data for one or multiple groups of users. The measurement data may then be considered as representative of the actual TN3270 service (in terms of availability and response time) perceived by these groups of users.

For a specific Distributed Measurement System, the list of groups of users is called the "Associated User List." Generally, the Associated User List is determined by a Network Administrator. It is possible to define a specific Distributed Measurement System (called "Default Distributed Measurement System") in an IP network for providing measurement data as a default to groups of users not attached to or represented by a particular Distributed Measurement System.

Master Probe Program

The distributed Availability and Response Time Probes 1103 are processed using multiple Distributed Measurement Systems 1102 spread in multiple locations. The data flow generated for retrieving the measurements from the various locations is described in FIG. 11.

A Master Probe program 1105 may be installed on a system in the IP network called "Master Measurement System" 1106. The Master Measurement System 1106 periodically gathers 1107 the Availability and Response Time Data Table 1104 from each Distributed Measurement System. The Master Probe program 1105 is configured with Master Probe Configuration Data 1108. The Master Probe Configuration Data 1108 contain a list of locations (which may be specified by IP address) of the Distributed Measurement Systems 1102 which are to be accessed by the Master Probe and the frequency for retrieving the Availability and Response Time Data Tables 1104. Additionally, for each Distributed Measurement System 1102, the Master Probe Configuration Data 1108 contain its "Associated User List", where groups of end users may be identified by their IP address, IP address subnets, or IP domain names. The Master Probe Configuration Data 1108 also identifies a Default Distributed Measurement System.

The Master Probe program 1105 updates a table called the "Aggregate Measurement Data Table" 1109 with the information contained in the Availability and Response Time Data Tables 1104 retrieved from the Distributed Measurement Systems 1102. The Aggregate Measurement Data Table 1109 may contain availability and response time measurements for each TN3270 Server and for each group of end users. Again, the groups of end users may be identified by their IP address, their IP address subnets, or their IP domain names.

Automatic Configuration of TN3270 Clients

Figure 11:
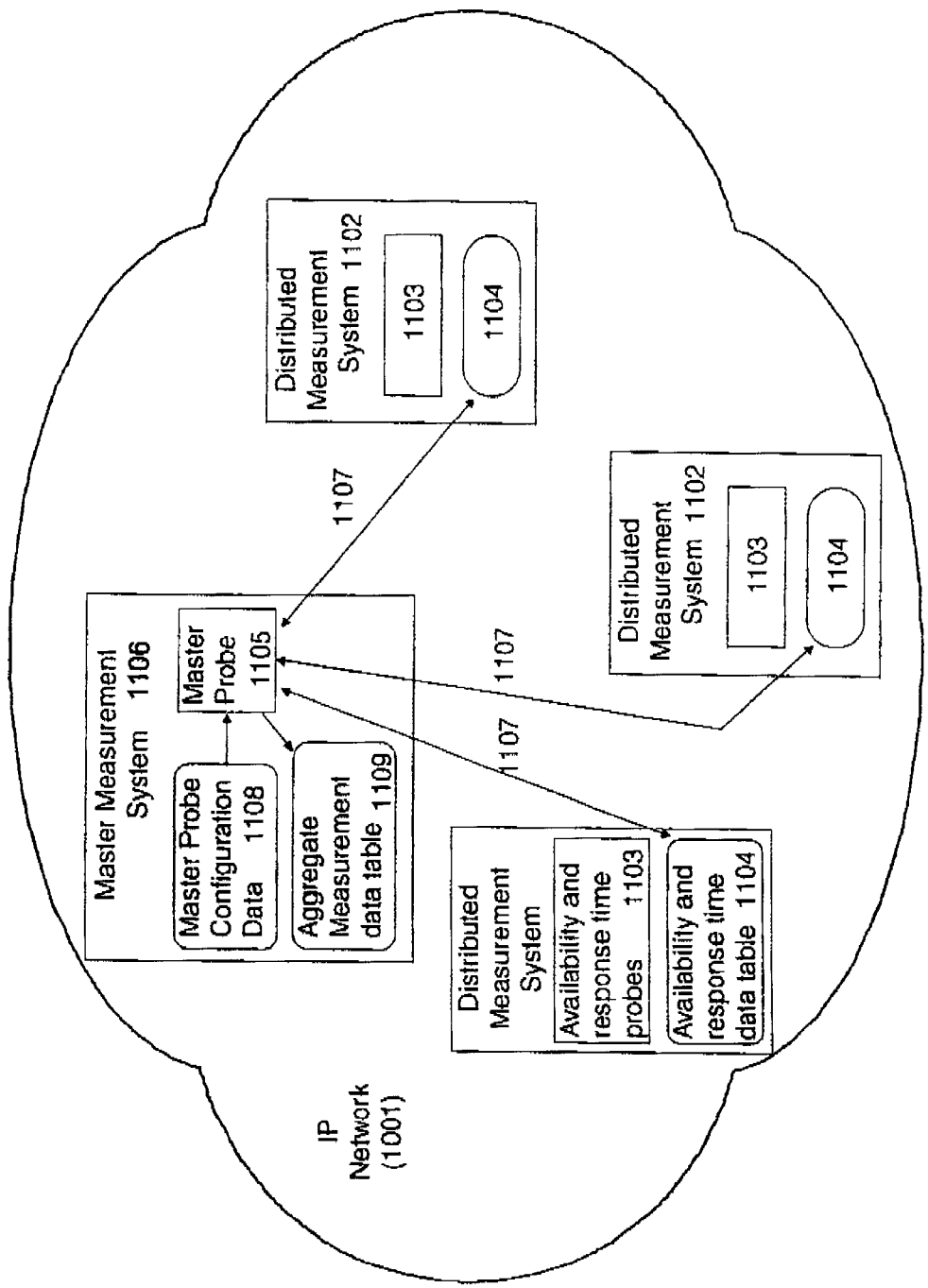
FIG. 11 is a view of the step of retrieving availability and response time measurements from distributed measurement systems according to the present invention.

The process of automatically configuring TN3270 Clients with the optimal TN3270 Servers is described with reference to FIG. 12. Measurements gathered by the distributed Probes are indirectly downloaded to the TN3270 Clients by the Autoserver URL system according to the process detailed hereafter. The measurements observed by the Probes are stored in the Distributed Measurement Systems as shown in FIGS. 10 and 11. A Master Probe program running on the Autoserver URL system periodically connects to the multiple Distributed Measurement Systems to gather the measurements retrieved by the Probes. These measurements are then used to create the Autoserver code (Javascript code in one embodiment).

Performances on end user workstations are not degraded because availability and response time measurements are not processed within the downloaded Autoserver code but rather in the Autoserver URL system. A CGI (Common Gateway Interface) program dynamically creates the Autoserver code with the availability and response time information provided by the Master Probe. The use of response time and availability criteria provides a proactive TN3270 Server failure detection mechanism through the integration of response time degradation.

Figure 12:
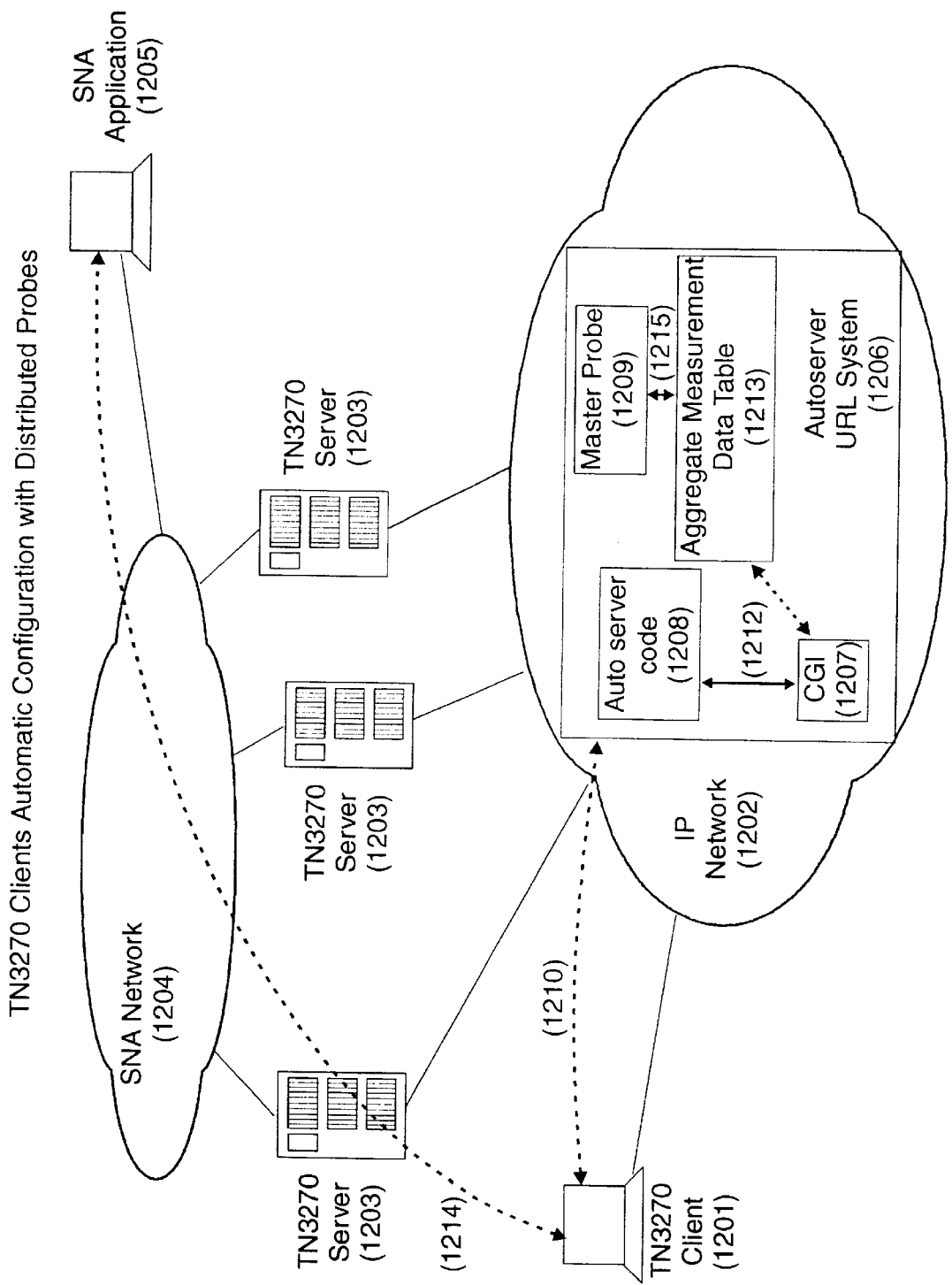
FIG. 12 is a view of the data flow associated with selection of the optimal TN3270 server and the automatic configuration of the TN3270 client according to the present invention.

FIG. 12 is a view of the data flow and logical entities associated with the distributed Probes used for automatically configuring TN3270 Clients. TN3270 Clients 1201 are attached to the IP network 1202, while the SNA Applications 1205 are attached to the SNA Network 1204. The TN3270 Servers 1203 provide access to the SNA Applications attached to the SNA Network.

The TN3270 Client 1201 may be configured with an Automatic Server Configuration option. A URL (Uniform Resource Locator) system called the "Autoserver URL System" 1206 is provided as configuration parameter 1210. When the TN3270 Client is started, it automatically connects 1212 to the Autoserver URL System 1206. The Autoserver URL System uses the CGI (Common Gateway Interface) 1207 program to dynamically generate 1215 an Autoserver code (which may be Javascript code) 1208. The Autoserver URL System 1206 also runs the Master Probe 1209 which periodically updates its Aggregate Measurement Data Table 1213. The Autoserver code is dynamically created 1212 by the CGI program 1207 using 1211 the information contained in the Aggregate Measurement Data Table.

The Autoserver code 1208 contains a list of all the SNA Applications that can be accessed by the TN3270 Client, including the designation of the appropriate TN3270 Server to access for each SNA Application. The Autoserver code can also designate a backup TN3270 Server to each SNA Application that may be accessed by the TN3270 Client 1212. The Autoserver code 1208 is downloaded to the TN3270 Client 1201 in particular when the TN3270 Client connects to the Autoserver URL System. In this way, the TN3270 Client may be automatically configured with the identity of the best available TN3270 Server to access a desired SNA Application 1214. The end user can then access the desired SNA Application by means of the best TN3270 Server because his TN3270 Client internally uses the Autoserver code to determine which TN3270 Server to use and the Autoserver code automatically determines the best TN3270 Server for this SNA Application.

The TN3270 Client connection to the Autoserver URL system, and the download of the Autoserver code to the TN3270 Client can be done using HTTP. In such a case, the Autoserver URL System may be implemented on a Web Server.

The TN3270 Client may be periodically and dynamically updated with a new selection of the best TN3270 Servers using a "refresh" tag in the Autoserver code, external code (or Java applet), or programming directly in the TN3270 Client for periodic and automatic refreshing of the Autoserver code. The end user is not required to connect to an Intermediate Selection Application in order to access a desired SNA Application. Because there is no need for an Intermediate Selection Application system, the access to the SNA Application is not slowed when such a system is unavailable or when such a system is overloaded.

The TN3270 Client need only connect once—when it is started—to the Autoserver URL System in order to receive the Autoserver code. The TN3270 Client may be programmed to use a local copy of Autoserver code if the Autoserver URL System cannot be reached.

Once an end user has terminated a connection with the target SNA Application, there is no need to close the TN3270 Client and restart it when the end user wants to connect to another SNA Application. Neither must the end user re-connect to the Autoserver URL system. There is no need to manually reconfigure the TN3270 Client each time the user requires access to a different SNA Application. The end user need only enter into the TN3270 Client the name of the second SNA Application and the same mechanism as depicted above executes to provide the Application.

A backup TN3270 Server can be provided to the TN3270 Client with no manual reconfiguration of the TN3270 Server. In such a case, the end user may still access the SNA Application even if the designated TN3270 Server fails.

TN3270 Servers names or locations need not be known nor configured by the end user. Accordingly, the invention provides for instance a seamless and optimized service to mobile users while still using the best TN3270 Server.

Program Running at Autoserver URL System

Figure 13:
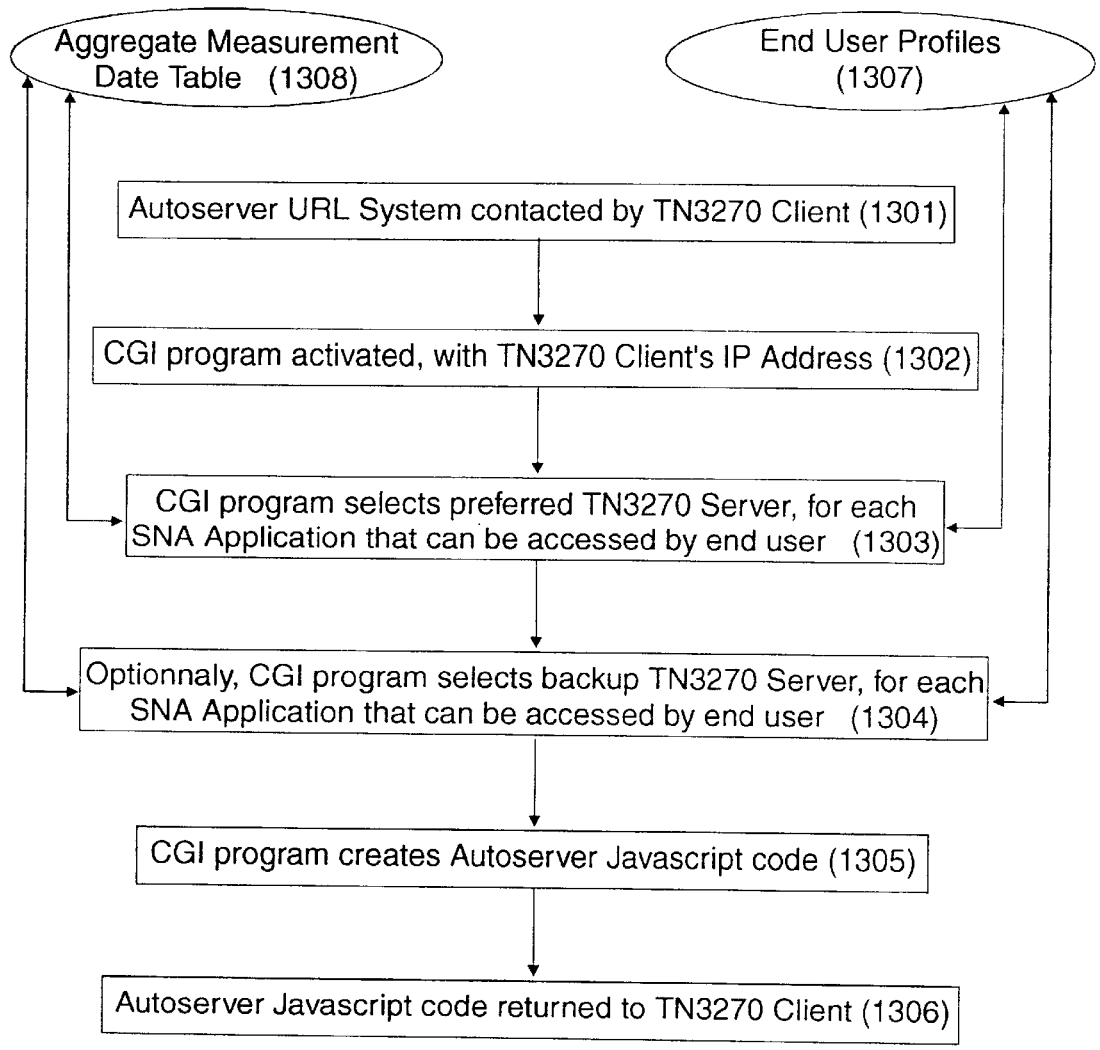
FIG. 13 is a flow chart of the program running on the Autoserver Uniform Resource Locator (URL) system.

FIG. 13 is a flow chart of the program of the instant invention running on the Autoserver URL System 1301. The Autoserver URL System is contacted by a TN3270 Client to retrieve the Autoserver code 1302. The Autoserver URL System activates the CGI (Common Gateway Interface) program (via CGI extensions). The CGI program has access to all standard CGI variables, including the IP (Internet Protocol) address of the TN3270 Client 1303. The CGI program selects the preferred TN3270 Server for each SNA Application that is to be accessed by the end user. This selection is based on both the IP address of the end user TN3270 Client (obtained as a CGI variable) and the information retrieved from the distributed Availability and Response Time Probes, as stored in the Aggregate Measurement Data Table 1308. Since the Aggregate Measurement Data Table contains data for each group of users, the IP address may be used to first determine to which group of users the TN3270 Client belongs. Then the data associated to that particular group of users in the Aggregate Measurement Data Table may be used by the CGI program to select the preferred TN3270 Server for each SNA Application that is accessed by the end user.

It should be noted that instead of using the IP address as a group selection criteria, it is possible to use the name of the end user to select the group. For example the name may be translated from the IP address using a reverse name look-up.

Optionally, the IP address may be used to add a geographical criteria to the TN3270 Server selection. For instance, if two TN3270 Servers provide the same response time (one in the US, the other one in Europe), the closest TN3270 Server may be preferred (e.g., the one in Europe if the end user TN3270 Client is in Europe) 1304. To improve the robustness of the TN3270 Server selection, the CGI program may optionally select a backup TN3270 Server for each SNA Application. This backup TN3270 Server may be automatically used by the TN3270 Client if attempts to use the designated TN3270 Server fail. The backup TN3270 Server may be selected using both the IP address (or the name) of the TN3270 Client (obtained as a CGI variable or through reverse table look-ups) and the information generated by the Availability and Response Time Probes and stored in the Aggregate Measurement Data Table.

Optionally, the Autoserver code may also provide a default TN3270 Server, to be used by the TN3270 Client to access SNA Applications which are not explicitly listed in the Autoserver code.

Optionally, the CGI program may use User Profiles 1307 located on the Autoserver URL system, to customize the list of SNA Applications provided in the Autoserver code according to some end-user-specific information. Such a configuration may be used, for instance, to define what SNA Applications an individual user (or a class of users) is supposed (and enabled) to access 1305.

Once the CGI program has selected the designated TN3270 Servers, and optionally the backup TN3270 Servers, it creates the Autoserver code. In one embodiment, the Autoserver code is in Javascript 1306. Once the Autoserver code has been created, the Autoserver URL system downloads it to the TN3270 Client via any standard communication means, for instance standard HTTP, as any other output of a CGI program.

While the invention has been particularly shown and described with reference to a specific details of an embodiment, it will be understood that various changes in form and detail may be made therein without departing from the spirit and scope of the invention.

What is claimed is:

1. A method for selecting a Server for accessing Systems Network Architecture (SNA) Applications from a Client in an Internet Protocol (IP) network comprising a plurality of Servers, said method comprising the steps of:

measuring performance and response times of each Server using at least one measurement probe in a measurement system distributed in the IP network;

transferring the performance and response time measurements to a single system within the IP network; and selecting in the single system an appropriate server for accessing a particular SNA application using said performance and response time measurements;

wherein the step of measuring performance and response time comprises the steps of:

retrieving data from the SNA Application through the Server; and measuring the response time for the step of retrieving the data.

2. The method of claim 1 wherein the measurement system is comprised of a plurality of measurement probes.

3. The method according to claim 2 wherein:

the measurement system is geographically distributed within the IP network;

the measurement system measurement probes are each associated with a set of clients; and each measurement probe is geographically close to the set of clients to which the measurement probes are associated.

4. The method according to claim 3 comprising the further step of identifying sets of clients by the clients' IP address.

5. The method according to claim 3 comprising the further step of identifying sets of clients by the clients' IP address subnet.

6. The method according to claim 3 comprising the further step of identifying sets of clients by the clients' IP domain name.

7. The method according to claim 3 comprising the further step of defining a default measurement system for clients not associated with a specific measurement system.

8. The method of claim 2 wherein the step of measuring is done at a plurality of measurement systems.

9. The method according to claim 1 further comprising the steps of:

creating in the single system a client configuration code according to the appropriate server; and downloading the client configuration code to the client.

10. The method according to claim 9 further comprising the step of dynamically updating the client configuration code in the single system according to the appropriate server.

11. The method according to claim 9 wherein the step of creating the client configuration code comprises processing via a common gateway interface (CGI) on the single system.

12. The method according to claim 9 further comprising the step of selecting a default server for SNA applications not explicitly listed in the client configuration code.

13. The method according to claim 1 wherein the step of selecting an appropriate server comprises the steps of:

comparing for each server the measured response time with response times previously measured;

determining for each server degradation of the measured response time relative to previously measured response times; and selecting an appropriate server based upon the various servers' degradations.

14. The method according to claim 13 wherein the step of selecting an appropriate server comprises the steps of:

detecting failures on each server; and excluding from consideration TN3270 servers in failure.

15. The method according to claim 1 wherein said step of measuring performance and response times of each Server comprises the step of storing in a performance and response time table the measurements of each Server in the measurement system.

16. The method according to claim 15 wherein the step of transferring the performance and response time measurements comprises the steps of:

gathering the measurements stored in the performance and response time data table of each measurement system; and storing the measurements in an aggregate measurement data table.

17. The method according to claim 1 wherein the single system is an uniform resource locator (URL) system.

18. The method according to claim 17 wherein the step of downloading a configuration code is processed using hypertext transfer protocol (HTTP).

19. The method of claim 1 wherein the step of measuring is done at a plurality of measurement systems.

20. The method of claim 1 wherein the data retrieved from the SNA Application is the Welcome Screen.

21. The method according to claim 1 wherein the step of selecting an appropriate server comprises the steps of:

detecting failures on each server; and excluding from consideration TN3270 servers in failure.

22. A system for selecting a Server for accessing Systems Network Architecture (SNA) Applications from a Client in an Internet Protocol (IP) network comprising a plurality of Servers, said system comprising:

means for measuring performance and response times of each Server using at least one measurement probe in a measurement system distributed in the IP network;

means for transferring the performance and response time measurements to a single system within the IP network; and means for selecting in the single system an appropriate server for accessing a particular SNA application using said performance and response time measurements;

wherein the means for measuring performance and response time comprises:

means for retrieving data from the SNA Application through the Server; and means for measuring the response time for the step of retrieving the data.

23. The system according to claim 22 wherein the measurement system is comprised of a plurality of measurement probes.

24. The system according to claim 23 wherein:

the measurement system is geographically distributed within the IP network;

the measurement system measurement probes are each associated with a set of clients; and each measurement probe is geographically close to the set of clients to which the measurement probes are associated.

25. The system according to claim 24 further comprising means for identifying sets of clients by the clients' IP address.

26. The system according to claim 24 further comprising means for identifying sets of clients by the clients' IP address subnet.

27. The system according to claim 24 further comprising means for identifying sets of clients by the clients' IP domain name.

28. The system according to claim 24 further comprising means for defining a default measurement system for clients not associated with a specific measurement system.

29. The system according to claim 23 wherein the means for measuring is done at a plurality of measurement systems.

30. The system according to claim 22 further comprising:

means for creating in the single system a client configuration code according to the appropriate server; and means for downloading the client configuration code to the client.

31. The system according to claim 30 further comprising means for dynamically updating the client configuration code in the single system according to the appropriate server.

32. The system according to claim 30 wherein the means for creating the client configuration code comprises means for processing via a common gateway interface (CGI) on the single system.

33. The system according to claim 30 further comprising means for selecting a default server for SNA applications not explicitly listed in the client configuration code.

34. The system according to claim 22 wherein the means for selecting an appropriate server comprises:

means for comparing for each server the measured response time with response times previously measured;

means for determining for each server degradation of the measured response time relative to previously measured response times; and means for selecting an appropriate server based upon the various servers' degradations.

35. The system according to claim 34 wherein the means for selecting an appropriate server comprises:

means for detecting failures on each server; and means for excluding from consideration TN3270 servers in failure.

36. The system according to claim 22 wherein said means for measuring performance and response times of each Server comprises the step of storing in a performance and response time table the measurements of each Server in the measurement system.

37. The system according to claim 36 wherein the means for transferring the performance and response time measurements comprises:

means for gathering the measurements stored in the performance and response time data table of each measurement system; and means for storing the measurements in an aggregate measurement data table.

38. The system according to claim 22 wherein the single system is an uniform resource locator (URL) system.

39. The system according to claim 38 wherein the means for downloading a configuration code is processed using hypertext transfer protocol (HTTP).

40. The system according to claim 22 wherein the means for measuring is done at a plurality of measurement systems.

41. The system according to claim 22 wherein the data retrieved from the SNA Application is the Welcome Screen.

42. The system according to claim 22 wherein the means for selecting an appropriate server comprises:

means for detecting failures on each server; and means for excluding from consideration TN3270 servers in failure.

43. A computer readable medium comprising instructions for selecting a Server for accessing Systems Network Architecture (SNA) Applications from a Client in an Internet Protocol (IP) network comprising a plurality of Servers, said instructions adapted to perform the steps of:

measuring performance and response times of each Server using at least one measurement probe in a measurement system distributed in the IP network;

transferring the performance and response time measurements to a single system within the IP network; and selecting in the single system an appropriate server for accessing a particular SNA application using said performance and response time measurements;

wherein the instructions for measuring performance and response time comprises instructions for the steps of:

retrieving data from the SNA Application through the Server; and measuring the response time for the step of retrieving the data.

44. The computer-readable medium according to claim 43 wherein the measurement system is comprised of a plurality of measurement probes.

45. The computer-readable medium according to claim 44 wherein:

the measurement system is geographically distributed within the IP network;

the measurement system measurement probes are each associated with a set of clients; and each measurement probe is geographically close to the set of clients to which the measurement probes are associated.

46. The computer-readable medium according to claim 45 further comprising instructions for identifying sets of clients by the clients' IP address.

47. The computer-readable medium according to claim 45 further comprising instructions for the step of identifying sets of clients by the clients' IP address subnet.

48. The computer-readable medium according to claim 45 further comprising instructions for the step of identifying sets of clients by the clients' IP domain name.

49. The computer-readable medium according to claim 45 further comprising instructions for the step of defining a default measurement system for clients not associated with a specific measurement system.

50. The computer-readable medium according to claim 44 wherein the instructions for measuring are performed at a plurality of measurement systems.

51. The computer-readable medium according to claim 43 further comprising instructions for performing the steps of:

creating in the single system a client configuration code according to the appropriate server; and downloading the client configuration code to the client.

52. The computer-readable medium according to claim 51 further comprising instructions for the step of dynamically updating the client configuration code in the single system according to the appropriate server.

53. The computer-readable medium according to claim 51 wherein the instructions for step of creating the client configuration code comprises instructions for processing via a common gateway interface (CGI) on the single system.

54. The computer-readable medium according to claim 51 further comprising instructions for performing the step of selecting a default server for SNA applications not explicitly listed in the client configuration code.

55. The computer-readable medium according to claim 43 wherein the instructions for selecting an appropriate server comprise instructions for the steps of:
   comparing for each server the measured response time with response times previously measured;
   determining for each server degradation of the measured response time relative to previously measured response times; and
   selecting an appropriate server based upon the various servers' degradations.

56. The computer-readable medium according to claim 55 wherein the instructions for selecting an appropriate server comprise instructions for the steps of:
   detecting failures on each server; and
   excluding from consideration TN3270 servers in failure.

57. The computer-readable medium according to claim 43 wherein said instructions for measuring performance and response times of each Server comprises instructions for the step of storing in a performance and response time table the measurements of each Server in the measurement system.

58. The computer-readable medium according to claim 57 wherein the instructions for transferring the performance and response time measurements comprise instructions for the steps of:
   gathering the measurements stored in the performance and response time data table of each measurement system; and
   storing the measurements in an aggregate measurement data table.

59. The computer-readable medium according to claim 43 wherein the single system is an uniform resource locator (URL) system.

60. The computer-readable medium according to claim 59 wherein the instructions for downloading a configuration code are processed using hypertext transfer protocol (HTTP).

61. The computer-readable medium according to claim 43 wherein the instructions for measuring are performed at a plurality of measurement systems.

62. The computer-readable medium according to claim 43 wherein the data retrieved from the SNA Application is the Welcome Screen.

63. The computer-readable medium according to claim 43 wherein the instructions for selecting an appropriate server comprise instructions for the steps of:
   detecting failures on each server; and
   excluding from consideration TN3270 servers in failure.

64. A method for selecting a Server for accessing Systems Network Architecture (SNA) Applications from a Client in an Internet Protocol (IP) network comprising a plurality of Servers, said method comprising the steps of:
   measuring performance and response times of each Server using at least one measurement probe in a measurement system distributed in the IP network;
   transferring the performance and response time measurements to a single system within the IP network; and
   selecting in the single system an appropriate server for accessing a particular SNA application using said performance and response time measurements;
   wherein the step of measuring performance and response time for retrieving the data comprises the steps of:
   establishing a connection with the SNA Application through the server;
   retrieving a set of data from the SNA Application; and
   checking the retrieved set of data.

65. The method according to claim 64 wherein the set of data retrieved from the SNA Application is the Welcome Screen.

66. The method according to claim 65 wherein the set of data is checked by comparison to a set of expected keywords.

67. A system for selecting a Server for accessing Systems Network Architecture (SNA) Applications from a Client in an Internet Protocol (IP) network comprising a plurality of Servers, said system comprising:
   means for measuring performance and response times of each Server using at least one measurement probe in a measurement system distributed in the IP network;
   means for transferring the performance and response time measurements to a single system within the IP network; and
   means for selecting in the single system an appropriate server for accessing a particular SNA application using said performance and response time measurements;
   wherein the means for measuring performance and response time for retrieving the data comprises:
   means for establishing a connection with the SNA Application through the server;
   means for retrieving a set of data from the SNA Application; and
   means for checking the retrieved set of data.

68. The system according to claim 67 wherein the set of data retrieved from the SNA Application is the Welcome Screen.

69. The system according to claim 68 wherein the set of data is checked by comparison to a set of expected keywords.

70. A computer readable medium comprising instructions for selecting a Server for accessing Systems Network Architecture (SNA) Applications from a Client in an Internet Protocol (IP) network comprising a plurality of Servers, said instructions adapted to perform the steps of:
   measuring performance and response times of each Server using at least one measurement probe in a measurement system distributed in the IP network;
   transferring the performance and response time measurements to a single system within the IP network; and
   selecting in the single system an appropriate server for accessing a particular SNA application using said performance and response time measurements;
   wherein the instructions for measuring performance and response time for retrieving the data comprises instructions for the steps of:
   establishing a connection with the SNA Application through the server;
   retrieving a set of data from the SNA Application; and
   checking the retrieved set of data.

71. The computer-readable medium according to claim 70 wherein the set of data retrieved from the SNA Application is the Welcome Screen.

72. The computer-readable medium according to claim 71 wherein the set of data is checked by comparison to a set of expected keywords.

* * * * *